(12) United States Patent
Gurtatowski (10) Patent No.: US 8,522,838 B2
(45) Date of Patent: Sep. 3, 2013

(54) GROMMET AND FUEL FILL HOUSING ASSEMBLY INCLUDING THE SAME

(75) Inventor: Craig W. Gurtatowski, Crown Point, IN (US)

(73) Assignee: Illinois Tool Works Inc., Glenview, IL (US)

( * ) Notice: Subject to any disclaimer, the term of this patent is extended or adjusted under 35 U.S.C. 154(b) by 1079 days.

(21) Appl. No.: 12/238,997

(22) Filed: Sep. 26, 2008

(65) Prior Publication Data

US 2010/0078932 A1 Apr. 1, 2010

(51) Int. Cl.
*B65B 1/04* (2006.01)

(52) U.S. Cl.
USPC ............................................. 141/350; 141/349

(58) Field of Classification Search
USPC .......................... 141/348–350; 285/189, 396
See application file for complete search history.

(56) References Cited

U.S. PATENT DOCUMENTS

| | | | |
|---|---|---|---|
| 4,462,620 A * | 7/1984 | Bambenek et al. | 285/140.1 |
| 7,306,017 B2 * | 12/2007 | Walkowski et al. | 141/350 |
| 7,647,955 B2 * | 1/2010 | Murabayashi et al. | 141/301 |

* cited by examiner

*Primary Examiner* — Davis Hwu
(74) *Attorney, Agent, or Firm* — Mark W. Croll; Paul F. Donovan (57) ABSTRACT

A grommet adapted to secure a fuel fill line to a fuel fill housing includes a body having an opening extending therethrough and a first flange coupled to the body. The first flange includes a plurality of tabs. The body also includes a second flange coupled to the body such that a channel is defined between each of the tabs and the second flange. Each respective mating tab is adapted to be received in each respective channel. The mating flange includes a plurality of slots. Each respective slot is formed between a pair of mating tabs. During installation, each tab is adapted to be inserted through a respective slot formed in the mating flange. The grommet also includes a latching device adapted to limit the radial movement of the grommet with respect to the mating flange. The latching device may be embodied as a detent adapted to be received in a recess formed in the mating flange. The grommet may also include a tactile indicator adapted to indicate when the grommet is in a predetermined radial position. A fuel fill housing assembly including the above described grommet is also described.

19 Claims, 6 Drawing Sheets

FIG. 9

GROMMET AND FUEL FILL HOUSING ASSEMBLY INCLUDING THE SAME

CROSS REFERENCE TO RELATED APPLICATION

This Non-Provisional Application claims benefit to U.S. Provisional Application Ser. No. 60/014,922 filed on Dec. 19, 2007, the complete subject matter of which is expressly incorporated herein in its entirety.

BACKGROUND OF THE INVENTION

The present invention relates generally to grommets, and more particularly to grommets used in a vehicle fuel system.

Vehicles include an engine and a fuel storage tank that provides fuel to the engine during operation. To refill the storage tank, the vehicles include a conventional fuel fill system that includes the fuel storage tank, a fuel fill housing, and a fuel fill pipe that is coupled between the fuel storage tank and the fuel fill housing. The fuel fill housing is generally mounted to a vehicle body and includes a door to cover the fuel fill housing. The fuel fill housing may be fabricated as a metal component that is formed unitarily with the vehicle body. Optionally, the fuel fill housing may be fabricated as a separate metal or plastic component that is attached to the vehicle body using a plurality of fasteners.

The fuel fill pipe is coupled to, and supported by the fuel fill housing a conventional flexible grommet. During operation, the grommet provides support for the fuel fill pipe and also provides for limited movement between the fuel fill pipe and the fuel fill housing. The grommet also creates a seal between the fuel fill pipe and the fuel fill housing to prevent fuel from spilling out of the fuel fill housing and also to prevent debris from entering the housing from the wheel well or below the vehicle. To meet the various operational requirements, the grommet is typically fabricated using a relatively stiff material.

However, conventional grommets may be difficult to install. For example, to install a conventional grommet, an operator squeezes the outer surface of the grommet and approximately simultaneously forces the grommet onto the fuel fill housing. This method of installation is performed manually and may be relatively time consuming. The fuel fill pipe is then coupled to the grommet by forcibly pushing the fuel fill pipe through an opening defined through the grommet. After the fuel fill pipe has been inserted into the grommet opening, the fuel fill pipe is adjusted to align the fuel fill pipe with the fuel storage tank and other mounting attachments provided elsewhere on the vehicle. Typically, the fuel fill pipe and conventional grommet are installed by an operator from beneath the vehicle such that the operator has no direct line of sight with either the end of the fuel fill pipe being inserted into the grommet or the grommet itself. As a result of adjusting the fuel fill pipe, the operator may inadvertently cause the grommet to be decoupled from the fuel fill housing. The fuel fill pipe must then be removed, the grommet reinstalled, and the fuel pipe reinstalled.

A need remains for a grommet that is easy to install, includes a feature that enables an operator to determine when the grommet is properly installed, and also enables the grommet to remain coupled to the fuel fill housing during installation.

BRIEF DESCRIPTION OF THE INVENTION

In one embodiment, a grommet adapted to secure a fuel fill line to a fuel fill housing is provided. The grommet includes a body having an opening extending therethrough and a first flange coupled to the body. The first flange includes a plurality of tabs. The body also includes a second flange coupled to the body such that a channel is defined between each of the tabs and the second flange. Each respective mating tab is adapted to be received in each respective channel. The mating flange includes a plurality of slots. Each respective slot is formed between a pair of mating tabs. During installation, each tab is adapted to be inserted through a respective slot formed in the mating flange. The grommet also includes a latching device adapted to limit the radial movement of the grommet with respect to the mating flange. The latching device may be embodied as a detent adapted to be received in a recess formed in the mating flange. The grommet may also include a tactile indicator adapted to indicate when the grommet is in a predetermined radial position.

In another embodiment, a fuel fill housing assembly is provided. The fuel fill housing assembly includes a fuel fill housing having a mating flange and a plurality of slots formed through the mating flange. The fuel fill housing assembly also includes a grommet comprising a plurality of tabs, each respective tab is adapted to be inserted through a respective mating flange slot to secure the grommet to the fuel fill housing. The mating flange includes a plurality of mating tabs. Each respective mating tab is formed between a pair of mating flange slots. The mating tabs are adapted to be received in a respective channel formed in the grommet.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 1:
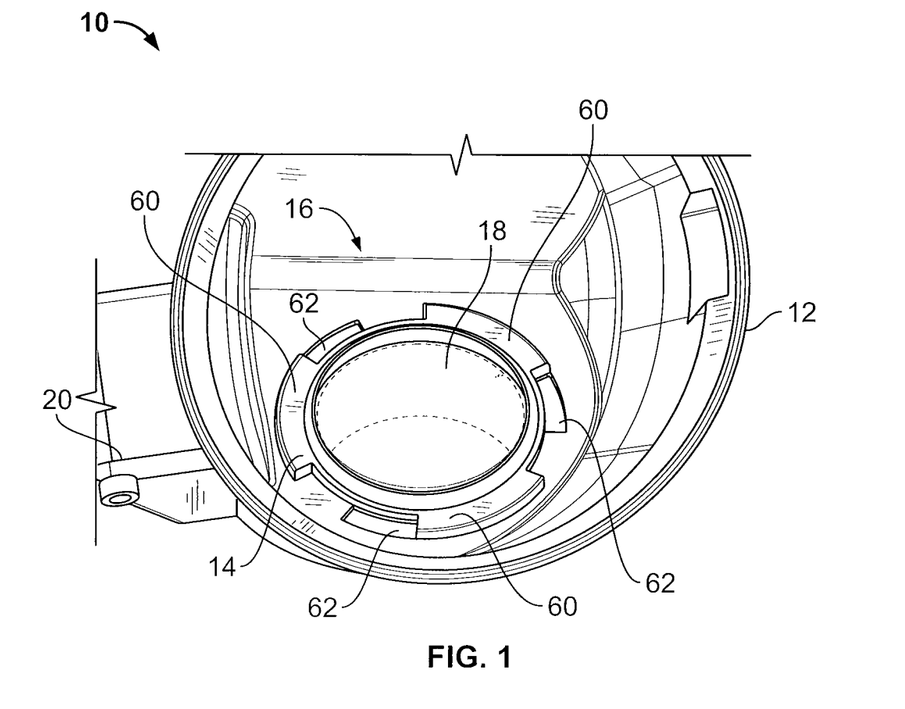
FIG. 1 is a top perspective view of an exemplary fuel fill housing assembly in accordance with an embodiment of the present invention.
Figure 2:
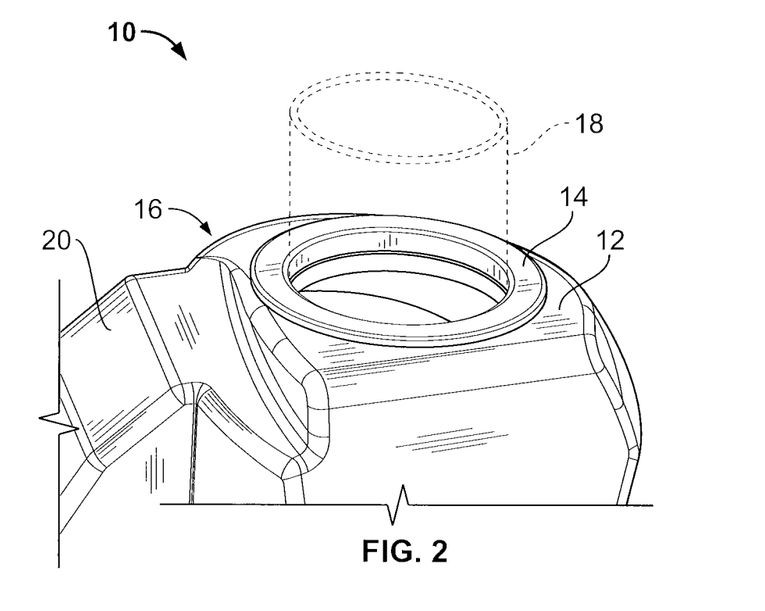
FIG. 2 is a bottom perspective view of the exemplary fuel fill housing assembly shown in FIG. 1 in accordance with an embodiment of the present invention.

FIG. 1 is a top perspective view of an exemplary fuel fill housing assembly 10 in accordance with an embodiment of the present invention. FIG. 2 is a bottom perspective view of the exemplary fuel fill housing assembly 10 shown in FIG. 1 in accordance with an embodiment of the present invention. As shown in FIGS. 1 and 2, the fuel fill housing assembly 10 includes a fuel fill housing 12 and an exemplary grommet 14 that is coupled to the fuel fill housing 12. The fuel fill housing 12 forms part of a vehicle fuel fill system 16, that includes the fuel fill housing 12, the grommet 14, a fuel fill line or pipe 18, and a fuel storage tank (not shown). The fuel fill housing 12 enables an operator to add fuel to the vehicle fuel storage tank via the fuel fill line 18 that is installed between the fuel fill housing 12 and the fuel storage tank. In one embodiment, the fuel fill housing 12 is mounted to a vehicle body 20 and includes a door (not shown) to cover the fuel fill housing 12. The fuel fill housing 12 may be fabricated as a metal component that is formed unitarily with the vehicle body 20. Optionally, the fuel fill housing 12 may be fabricated as a separate metal or plastic component that is attached to the vehicle body 20 using a plurality of fasteners. In one embodiment, the grommet 14 is fabricated using a rubber or plastic material. Optionally, the grommet 14 may be fabricated using any material that is suitable for use in a fuel fill system.

During operation, the grommet 14 provides support for the fuel fill line 18 and also provides for limited movement between the fuel fill line 18 and the fuel fill housing 12. The grommet 14 also creates a seal between the fuel fill line 18 and the fuel fill housing 12 to prevent fuel from spilling out of the fuel fill housing 12 and also to prevent debris from entering the fuel fill housing 12 from the wheel well or below the vehicle. More specifically, the grommet 14 is a flexible loop that provides fastening, support, and/or reinforcement between the fuel fill line 18 and the fuel fill housing 12. The grommet 14 also strengthens and/or protects the opening extending through the fuel fill housing 12 to protect the fuel fill line 18 passing through the fuel fill housing 12.

Figure 3:
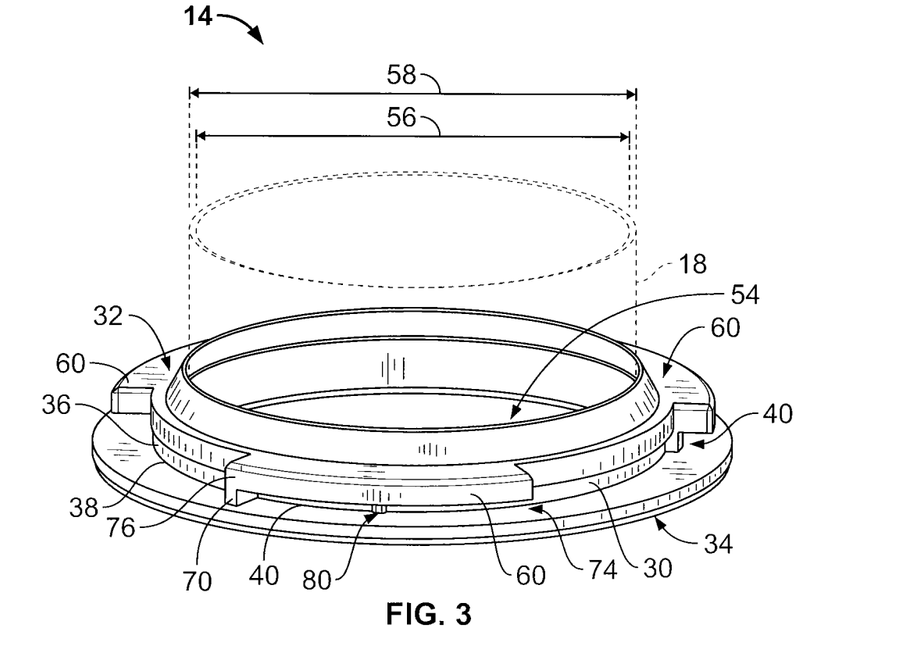
FIG. 3 is a perspective view of the exemplary grommet shown in FIGS. 1 and 2 in accordance with an embodiment of the present invention.
Figure 4:
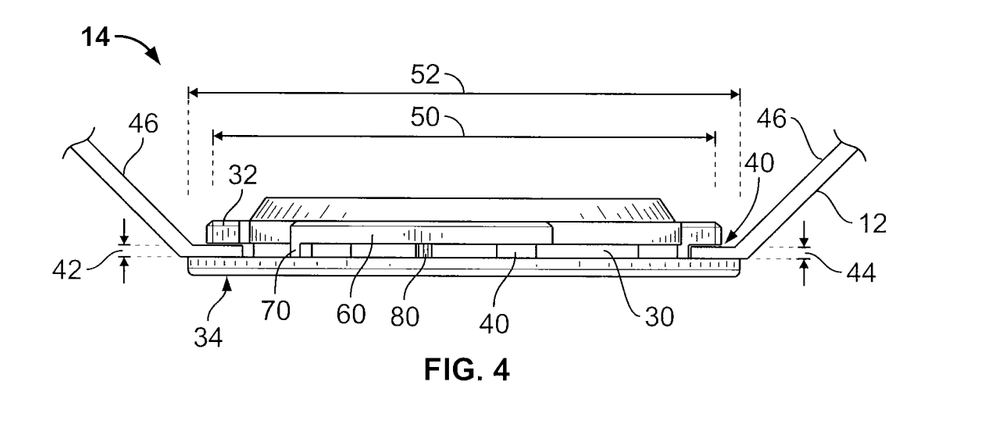
FIG. 4 is a side view of the exemplary grommet shown in FIG. 3 in accordance with an embodiment of the present invention.
Figure 5:
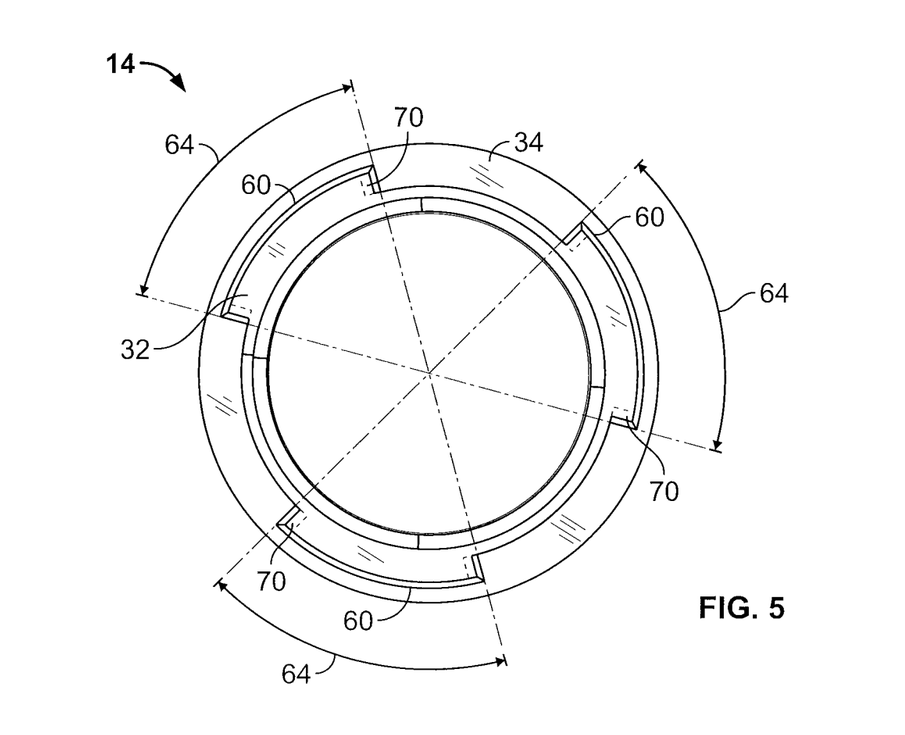
FIG. 5 is a top view of the exemplary grommet shown in FIG. 3 in accordance with an embodiment of the present invention.

FIG. 3 is a perspective view of the exemplary grommet 14 shown in FIGS. 1 and 2 in accordance with an embodiment of the present invention. FIG. 4 is a side view of the exemplary grommet 14 shown in FIG. 3. FIG. 5 is a top view of the exemplary grommet 14 shown in FIG. 3. In the exemplary embodiment, the grommet 14 includes a tubular body member 30, a first circular flange 32, and a second circular flange 34. The first circular flange 32 is coupled to a first end 36 of the body member 30 and the second circular flange 34 is coupled to an opposite end 38 of the body member 30 such that a plurality of channels or gaps 40 are defined between the first and second flanges 32 and 34. Each channel 40 has a width 42 that is approximately the same as a width 44 of a mating flange 46 formed on the fuel fill housing 12. In the exemplary embodiment, the grommet 14 is fabricated as a unitary component to include the body member 30 and the first and second flanges 32 and 34.

As shown in FIG. 4, the first flange 32 has an outer diameter 50 and the second flange 34 has an outer diameter 52 that is greater than the first flange outer diameter 50. Moreover, the grommet 14 includes an opening 54 having an outer diameter 56 that is substantially similar to the outer diameter 58 of the fuel fill line 18. During assembly, the fuel fill line 18 is at least partially inserted through the opening 54 to enable the grommet 14 to create a seal between the fuel fill line 18 and the fuel fill housing 12 as discussed above.

Figure 6:
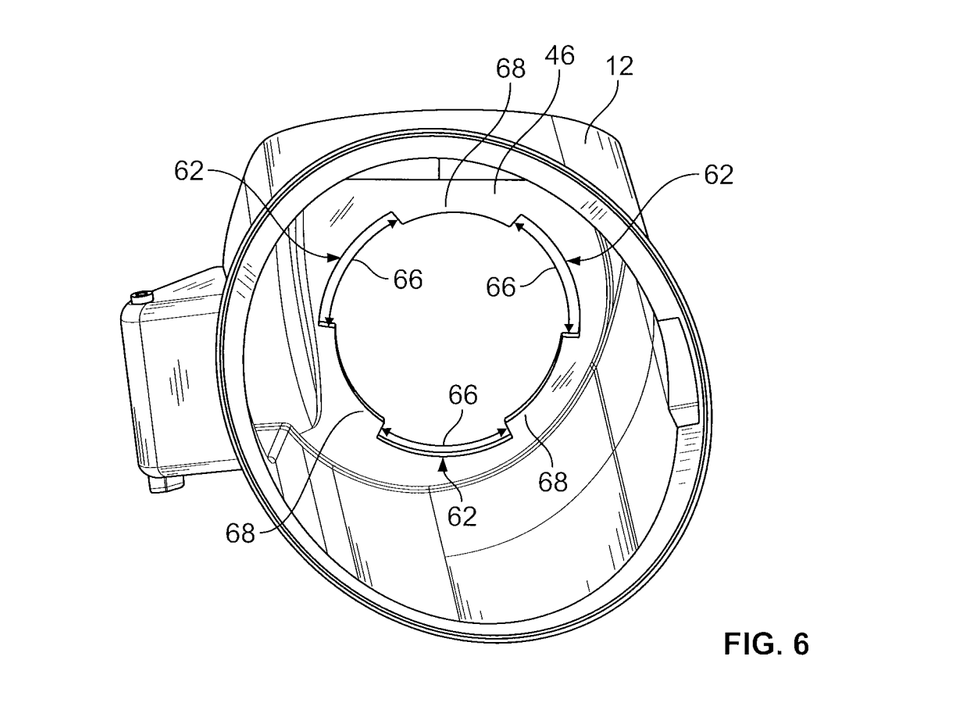
FIG. 6 is a top view of the exemplary fuel fill housing shown in FIG. 1 in accordance with an embodiment of the present invention.

As shown in FIG. 5, the first flange 32 includes a plurality of tabs or keys 60 that are each configured to be inserted through a respective slot or keyway 62 (shown in FIG. 6) formed on the fuel fill housing mating flange 46. During operation, the combination of the tabs 60 and the slots 62 facilitate securing the grommet 14 to the fuel fill housing 12 as will be discussed in more detail below. It should be realized that although the figures illustrate the first flange 32 including three tabs 60, the first flange may include two tabs 60 or more than three tabs 60, and that the three tabs 60 are exemplary. In the exemplary embodiment, the quantity of tabs 60 is equal to the quantity of slots 62 such that each tab 60 is inserted into a respective slot 62 of the mating flange 46. As shown in FIG. 5, and in the exemplary embodiment, each tab 60 has a radial length 64 that is greater than approximately forty-five degrees. As shown in FIG. 6, each slot 62 formed on the mating flange 46 has a radial length 66 that is greater than the radial length 64 of the tabs 60 to enable each tab 60 to be inserted through a respective slot 62. The portion of the mating flange 46 that is defined between the slots 62 is referred to herein as mating tabs 68. In the exemplary embodiment, the quantity of mating tabs 68 is equal to the quantity of slots 62 and the quantity of tabs 60. During assembly, discussed in more detail below, each mating tab 68 is configured to be received in a respective channel 40. Each channel 40 is defined between a respective tab 60 and the second flange 34.

Referring again to FIGS. 3-5, at least one of the tabs 60 includes an over travel stop 70 that is formed between the first flange 32 and the second flange 34. In the exemplary embodiment, the over travel stop 70 is formed unitarily with and between the tab 60 and the second flange 34, and thus is formed unitarily with the grommet 14. In the exemplary embodiment, the recess formed between the body member 30, the tab 60, the second flange 34, and the over travel stop 70 forms the channel 40. In the exemplary embodiment, each channel 40 has a first open end 74 that is configured to receive a respective mating tab 68 therein, and a second closed end 76 that is defined by the over travel stop 70. Optionally, at least one channel 40 does not include the over travel stop 70 and therefore each end of the channel 40 is open. Referring again to FIG. 3, the grommet 14 includes at least one latching device 80 that is adapted to lock or secure the mating tab 68 within the channel 40 after installation is completed. The latching device 80 is also adapted to limit the radial movement of the grommet 14 with respect to the fuel fill housing 12. In the exemplary embodiment, the latching device 80 is a detent that is formed unitarily with the tab 60 and extends radially inward from the tab 60 at least partially into the channel 40. The method of installing the grommet 14 into the fuel fill housing 12 is discussed below.

Figure 7:
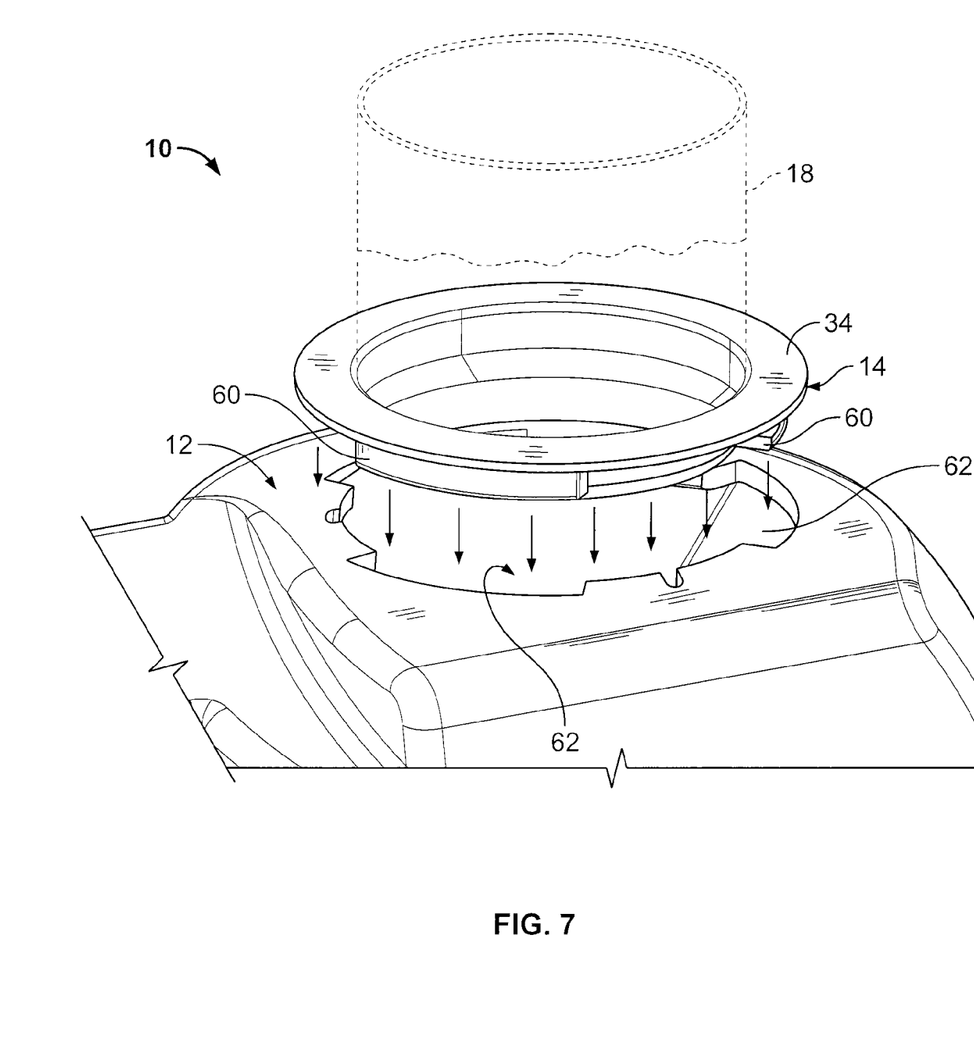
FIG. 7 is an exploded view of the fuel fill housing assembly shown in FIG. 1 in accordance with an embodiment of the present invention.

FIG. 7 is a bottom perspective view of the fuel fill housing assembly 10 illustrating the grommet 14 positioned to be installed or coupled to the fuel fill housing 12. As shown in FIG. 7, the grommet 14 is installed from the bottom side of the fuel fill housing 12. During installation, the grommet 14 is positioned such that each grommet tab 60 is approximately aligned with a respective slot 62 formed in the fuel fill housing 12. The grommet tabs 60 are then inserted through the slots 62 until the second flange 34 contacts the fuel fill housing 12. The grommet 14 is then rotated to secure the grommet 14 to the fuel fill housing 12.

Figure 8:
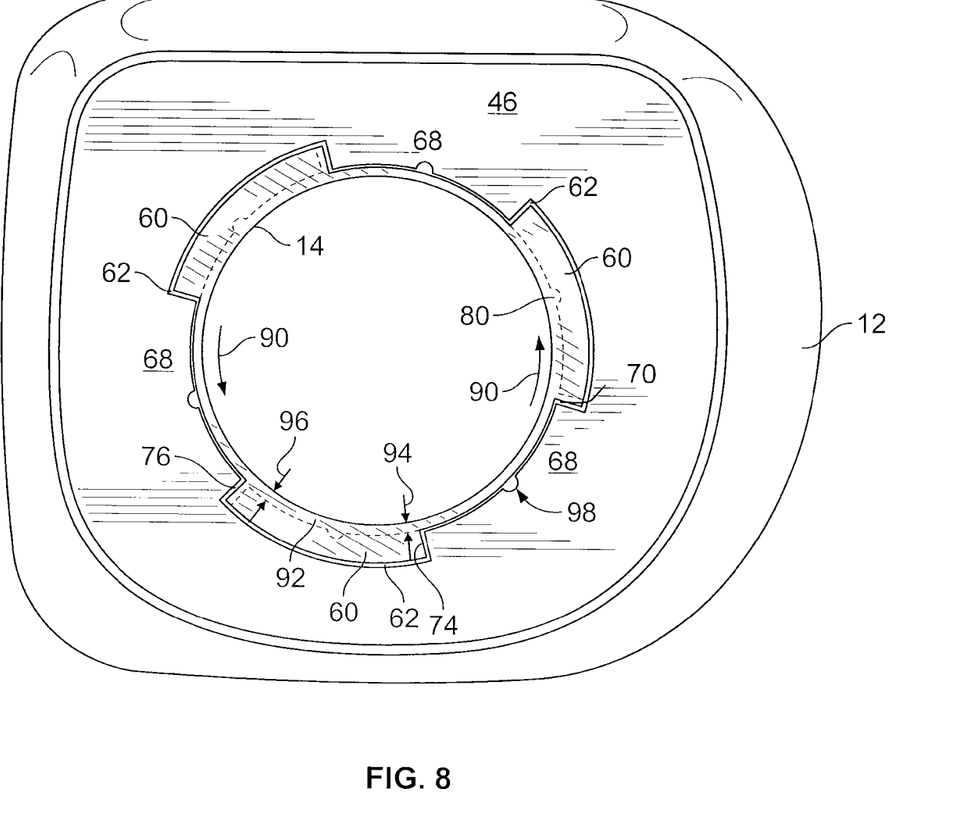
FIG. 8 is a top perspective view of the grommet shown in FIG. 1 in a first installation position in accordance with an embodiment of the present invention.
Figure 9:
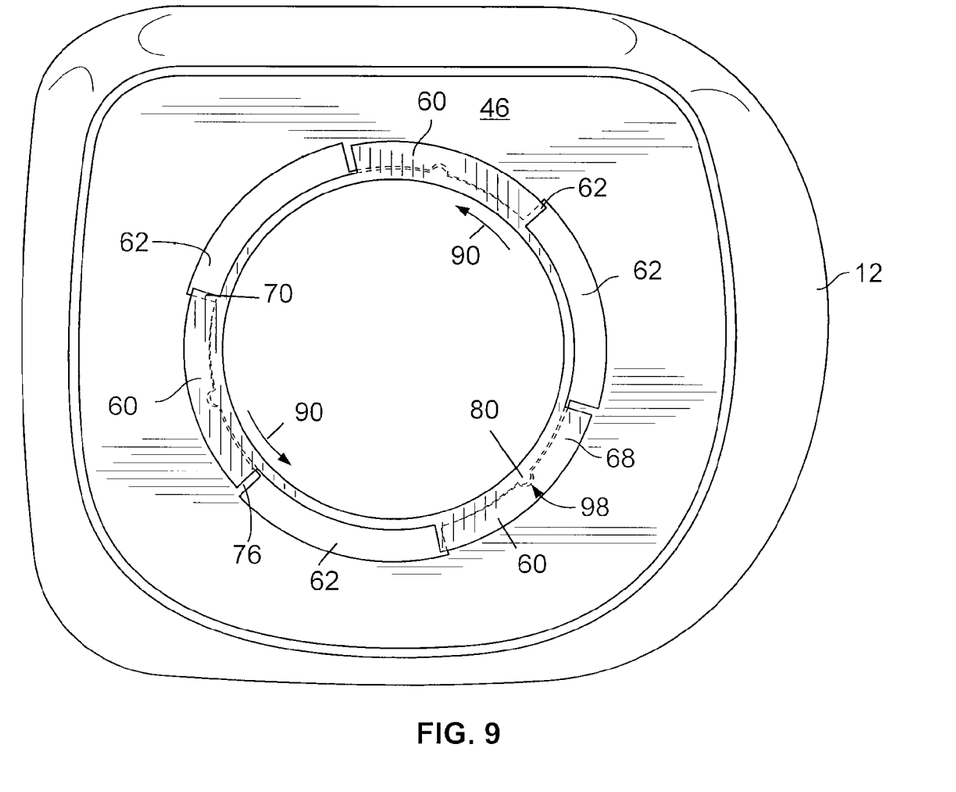
FIG. 9 is a top perspective view of the grommet shown in FIG. 1 in a second installation position in accordance with an embodiment of the present invention.

FIG. 8 is a top perspective view of the grommet 14 in a first installation position, e.g. prior to being rotated in a radial direction 90. FIG. 9 is a top perspective view of the grommet 14 in a second or installed position, e.g. after the grommet 14 has been rotated in the radial direction 90. In the exemplary embodiment, in the first installation position, the grommet tabs 60 have been inserted through the slots 62 and the second flange 34 is contacting the fuel fill housing 12. The grommet 14 is then rotated to the installed position, e.g. each mating tab 68 is at least partially inserted into a respective channel 40 (shown in FIG. 1).

As discussed above, it may be difficult for an installer to determine if a conventional grommet is installed correctly on a conventional fuel fill housing. As such, in the exemplary embodiment, at least a portion of the grommet 14 includes a tactile indicator embodied as a tapered portion 92. As shown in FIGS. 8 and 9, the grommet 14 the portion of the grommet body between the grommet first end 74 and the grommet second end 76 is tapered such that a thickness 94 of the tapered portion 92 proximate to the grommet first end 74 is less than a thickness 96 of the tapered portion 92 proximate to the grommet second end. During installation, when the grommet 14 is positioned in the first installation position, e.g. the grommet tabs 60 have been inserted through the slots 62 and the second flange 34 is contacting the fuel fill housing 12, a gap is defined between the tapered portion 92 and the mating tabs 68. As the grommet is rotated in the radial direction 90, the gap between the tapered portion 92 and the mating tabs 68 decreases. When the grommet is rotated to the installed position, a portion of the tapered portion 92 contacts the mating tabs 68 thus increasing the amount of force required to continue rotating the grommet 14 in the radial direction 90. This increased force provides a tactile indication to the installer that the grommet 14 has been rotated to the proper installation position. Moreover, if the installer continues to rotate the grommet 14 in the radial direction 90, the over travel stop 70 is adapted to prevent the grommet 14 from being rotated past the installed position. Accordingly, the tapered portion 92 and the over travel stop 70 are each adapted to provide a tactile indication to the installer that the grommet is in the installed position.

In another exemplary embodiment, the tactile indicator may be embodied as the detent 80 and a slot 98 formed in the mating tab 68. For example, as the grommet is rotated in the radial direction 90, the detent 80 that is formed on the grommet 14 also moves in the radial direction 90. When the grommet is rotated to the installed position, the detent 80 engages the slot 98 to substantially prevent the grommet 14 from being further rotated. This increased resistance to rotation caused by the engagement of the detent 80 into the slot 98 provides a tactile indication to the installer that the grommet 14 has been rotated to the proper installation position. Moreover, as discussed above, if the installer continues to rotate the grommet 14 in the radial direction 90, the over travel stop 70 is adapted to prevent the grommet 14 from being rotated past the installed position. In another exemplary embodiment, the engagement of the detent 80 into the slot 98 emits an audio indication that informs the installer that the grommet 14 is in the installed position.

Described herein is a grommet that is utilized to secure a fuel line to a fuel fill housing that is installed on a vehicle body. The fuel fill housing includes a mating flange that is fabricated to include a plurality of mating tabs and a slot defined between a pair of adjacent mating tabs. More specifically, each slot is formed between an adjacent pair of mating tabs. The slots may be formed by removing material from the mating flange to produce both the slots and the mating tabs. The grommet includes a first flange, a second flange, and a plurality of channels formed between the first and second flanges. The first flange includes a plurality of tabs. Each respective tab is adapted to be inserted through a respective slot formed in the mating flange. Each respective channel is adapted to receive a respective mating tab. During installation, the mating tabs are adapted to fit loosely within the respective channels. As the grommet is rotated, a tapered surface formed on the body of the grommet causes the grommet to get tighter. More specifically, the radius of the tapered surface gradually increases to match the radius of the mating tabs such that as the grommet is rotated the radiuses eventually become equal and limit further radial movement of the grommet. A detent feature provides either a tactile or audio indication that the grommet is rotated to the correct or fully installed position. A over travel stop feature prevents the grommet from being over rotated. Moreover, the over travel stop features provides additional strength to the grommet by coupling the first flange to the second flange. The grommet also provides for easier installation than known grommets, thus reducing installer fatigue and potential hand injuries.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A unitary grommet for a fuel fill housing including a mating flange, the grommet comprising:
a tubular body having an opening extending therethrough;
a first flange integrally coupled to the body, the first flange comprising a plurality of tabs radially extending from the tubular body; and
a second flange integrally coupled to and radially extending from the tubular body, wherein the plurality of tabs of the first flange overhang at least a portion of the second flange such that a channel is defined by an outer surface of the tubular body between each of the tabs and the second flange, wherein each channel has a width that is approximately the same as a width of the mating flange of the fuel fill housing, wherein at least a portion of the mating flange is adapted to be received in each respective channel.

2. A grommet in accordance with claim 1 wherein the mating flange includes a plurality of slots, each respective slot is formed between a pair of mating tabs, each mating tab is adapted to be inserted at least partially into a respective channel.

3. A grommet in accordance with claim 1 wherein the second flange is sized to limit the axial movement of the grommet through the mating flange.

4. A grommet in accordance with claim 1 wherein the first flange has a first diameter and the second flange has a second diameter that is greater than the first diameter.

5. A grommet in accordance with claim 1 further comprising a latching device adapted to limit the radial movement of the grommet with respect to the mating flange.

6. A grommet in accordance with claim 1 wherein the mating flange further includes a recess, the grommet further comprising at least one detent adapted to be received in the mating flange recess to limit the radial movement of the grommet.

7. A grommet in accordance with claim 1 further comprising a tactile indicator adapted to indicate when the grommet is in a predetermined radial position.

8. A grommet in accordance with claim 1 wherein each channel includes a tapered surface adapted to limit the radial movement of the grommet.

9. A grommet in accordance with claim 1 wherein each channel includes a tapered surface adapted to provide a tactile indication that the grommet is in a predetermined radial position with respect to the mating flange.

10. A grommet in accordance with claim 1 further comprising an over travel stop device adapted to limit the radial movement of the grommet with respect to the mating flange.

11. A fuel fill housing assembly comprising:
a fuel fill housing comprising a mating flange and a plurality of slots formed through the mating flange; and
a unitary grommet comprising a plurality of tabs, each respective tab is adapted to be inserted through a respective mating flange slot to secure the grommet to the fuel fill housing, wherein the unitary grommet includes:
a tubular body having an opening extending therethrough;
a first flange integrally coupled to the body, the first flange comprising the plurality of tabs radially extending from the tubular body; and
a second flange integrally coupled to the body and radially extending from the tubular body, wherein the plurality of tabs of the first flange overhang at least a portion of the second flange such that a channel is defined by an outer surface of the tubular body between each of the tabs and the second flange, wherein each channel has a width that is approximately the same as a width of the mating flange of the fuel fill housing.

12. A fuel fill housing assembly in accordance with claim 11 wherein the mating flange further comprises a plurality of mating tabs, wherein each respective mating tab is formed between a pair of mating flange slots, each mating tab is adapted to be received in a respective channel formed in the grommet.

13. A fuel fill housing assembly in accordance with claim 11 wherein the second flange is sized to limit the axial movement of the grommet through the mating flange.

14. A fuel fill housing assembly in accordance with claim 11 wherein the second flange has a second diameter that is greater than the first diameter.

15. A fuel fill housing assembly in accordance with claim 11 wherein the grommet further comprises a latching device adapted to limit the radial movement of the grommet with respect to the mating flange.

16. A fuel fill housing assembly in accordance with claim 11 wherein the mating flange comprises a recess and the grommet further comprises at least one detent adapted to be received in the mating flange recess to limit the radial movement of the grommet.

17. A fuel fill housing assembly in accordance with claim 11 wherein the grommet further comprises a tactile indicator adapted to indicate when the grommet is in a predetermined radial position.

18. A fuel fill housing assembly in accordance with claim 11 wherein the grommet includes a tapered surface adapted to limit the radial movement of the grommet.

19. A fuel fill housing assembly in accordance with claim 11 wherein the grommet includes an over travel stop device adapted to limit the radial movement of the grommet with respect to the mating flange.

* * * * *